(12) United States Patent
Fujimori

(10) Patent No.: US 10,553,883 B2
(45) Date of Patent: Feb. 4, 2020

(54) INDUSTRIAL VEHICLE HAVING A FUEL CELL SYSTEM

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventor: Hiroyuki Fujimori, Aichi-ken (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 123 days.

(21) Appl. No.: 15/722,236

(22) Filed: Oct. 2, 2017

(65) Prior Publication Data

US 2018/0097244 A1 Apr. 5, 2018

(30) Foreign Application Priority Data

Oct. 5, 2016 (JP) .................................. 2016-197049

(51) Int. Cl.
*G06F 19/00* (2018.01)
*G06G 7/70* (2006.01)
*H01M 8/04223* (2016.01)

(52) U.S. Cl.
CPC .... *H01M 8/04223* (2013.01); *H01M 2250/20* (2013.01)

(58) Field of Classification Search
CPC ............. H01M 8/04223; H01M 8/043; H01M 8/04865; G06F 7/00; G06F 19/00

USPC ...................................................... 701/99, 36
See application file for complete search history.

(56) References Cited

U.S. PATENT DOCUMENTS 6,804,591 B1 * 10/2004 Miyazawa ............ G06F 1/3203
701/36
2016/0141674 A1 * 5/2016 Shiokawa ......... H01M 8/04492
429/432

FOREIGN PATENT DOCUMENTS

JP 2014-050240 A 3/2014
JP 2014050240 A * 3/2014

OTHER PUBLICATIONS

English Translation for JP2014050240A.*

* cited by examiner

Primary Examiner — Mahmoud S Ismail
(74) Attorney, Agent, or Firm — Sughrue Mion, PLLC

(57) ABSTRACT

An industrial vehicle having a fuel cell system includes a vehicle key switch which has at least an ON position and an OFF position and is switchable between the ON position and the OFF position and a controller configured to control the fuel cell system in conjunction with manipulation of the key switch. When the controller detects that the key switch is turned from the OFF position to the ON position, the controller causes the fuel cell system to start electric power generation. When the controller detects that the key switch is turned from the ON position to the OFF position, the controller causes the fuel cell system to start a voltage maintenance control. When the controller detects that the key switch at the ON position is manipulated in a specified manner, the controller causes the fuel cell system to stop the electric power generation.

3 Claims, 4 Drawing Sheets

INDUSTRIAL VEHICLE HAVING A FUEL CELL SYSTEM

CROSS-REFERENCE TO RELATED APPLICATIONS

This application claims priority from Japanese Patent Application No. 2016-197049, filed on Oct. 5, 2016, the disclosure of which is incorporated herein in its entirety by reference.

STATEMENT REGARDING FEDERALLY SPONSORED RESEARCH OR DEVELOPMENT

Not Applicable.

THE NAMES OF THE PARTIES TO A JOINT RESEARCH AGREEMENT INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

BACKGROUND OF THE INVENTION

The present invention relates to an industrial vehicle on which a fuel cell system is mounted, and more particularly, to an industrial vehicle having a fuel cell system which is controlled in conjunction with the on and off operation of a key switch of the vehicle.

Vehicles having a fuel cell system have been now put into practical use. Generally, a fuel cell system having a fuel cell stack formed by laminating a plurality of power generating cells is configured to generate electric power by supplying hydrogen gas and air to the fuel cell stack and causing chemical reaction between the hydrogen gas and oxygen contained in the air in the respective power generating cells.

Examples of the practical applications of such fuel cell system include industrial vehicles such as forklift trucks. In some of the industrial vehicles having the fuel cell system, the fuel cell system is controlled in conjunction with the on and off operation of the key switch of the vehicle. Specifically, when the key switch of the industrial vehicle is turned on, the fuel cell system starts generation of electric power and the vehicle becomes operable; when the key switch is turned off, the electric power generation of the fuel cell system is stopped or suspended and the vehicle becomes inoperable. Japanese Unexamined Patent Application Publication No. 2014-50240 discloses an industrial vehicle of the type described above.

It is a usual practice for an operator of an industrial vehicle such as a forklift truck to get on and get off the vehicle frequently for the reason of various works to do on and off the vehicle. As a safety education, operators of the forklift truck are instructed to always turn the key switch of the forklift truck to the OFF position before getting off the forklift truck, regardless of whether it is a temporal leave or not. Therefore, the key switch of the industrial vehicle is turned on and off frequently and accordingly the electric power generation of the fuel cell system is started and suspended frequently in conjunction with the turning on and off operation of the key switch.

In general, frequent switching between the start and the suspension of electric power generation of the fuel cell system in a vehicle accelerates deterioration of the fuel cell stack of the fuel cell system. In particular, it is generally known that the deterioration of the fuel cell stack is accelerated if the voltage of cells of the fuel cell stack varies crossing their allowable minimum voltage of approx. 0.6 V.

In starting the fuel cell system for electric power generation, air compressor needs to be started for supplying air to the fuel cell stack. However, starting the air compressor requires a large amount of electric power. In stopping or suspending the electric power generation of the fuel cell system, the air compressor is kept running for a specified period of time in order to drain water remaining in the fuel cell stack, which also requires some electric power. In other words, repeated start and stop of electric power generation of the fuel cell system also poses a problem in the energy efficiency.

The present invention which has been made in view of the circumstances above is directed to providing an industrial vehicle having a fuel cell system that is capable of preventing deterioration of the fuel cell stack and a drop in the energy efficiency under a working environment where the key switch of the vehicle is turned on and off frequently.

BRIEF SUMMARY OF THE INVENTION

In accordance with an aspect of the present invention, there is provided an industrial vehicle having a fuel cell system. The industrial vehicle includes a vehicle key switch which has at least an ON position and an OFF position and is switchable between the ON position and the OFF position and a controller configured to control the fuel cell system in conjunction with manipulation of the key switch. When the controller detects that the key switch is turned from the OFF position to the ON position, the controller causes the fuel cell system to start electric power generation. When the controller detects that the key switch is turned from the ON position to the OFF position, the controller causes the fuel cell system to start a voltage maintenance control. When the controller detects that the key switch at the ON position is manipulated in a specified manner, the controller causes the fuel cell system to stop the electric power generation.

Other aspects and advantages of the invention will become apparent from the following description, taken in conjunction with the accompanying drawings, illustrating by way of example the principles of the invention.

DETAILED DESCRIPTION OF THE EMBODIMENTS

The following will describe an embodiment of the present invention with reference to the accompanying drawings.

First Embodiment

Figure 1:
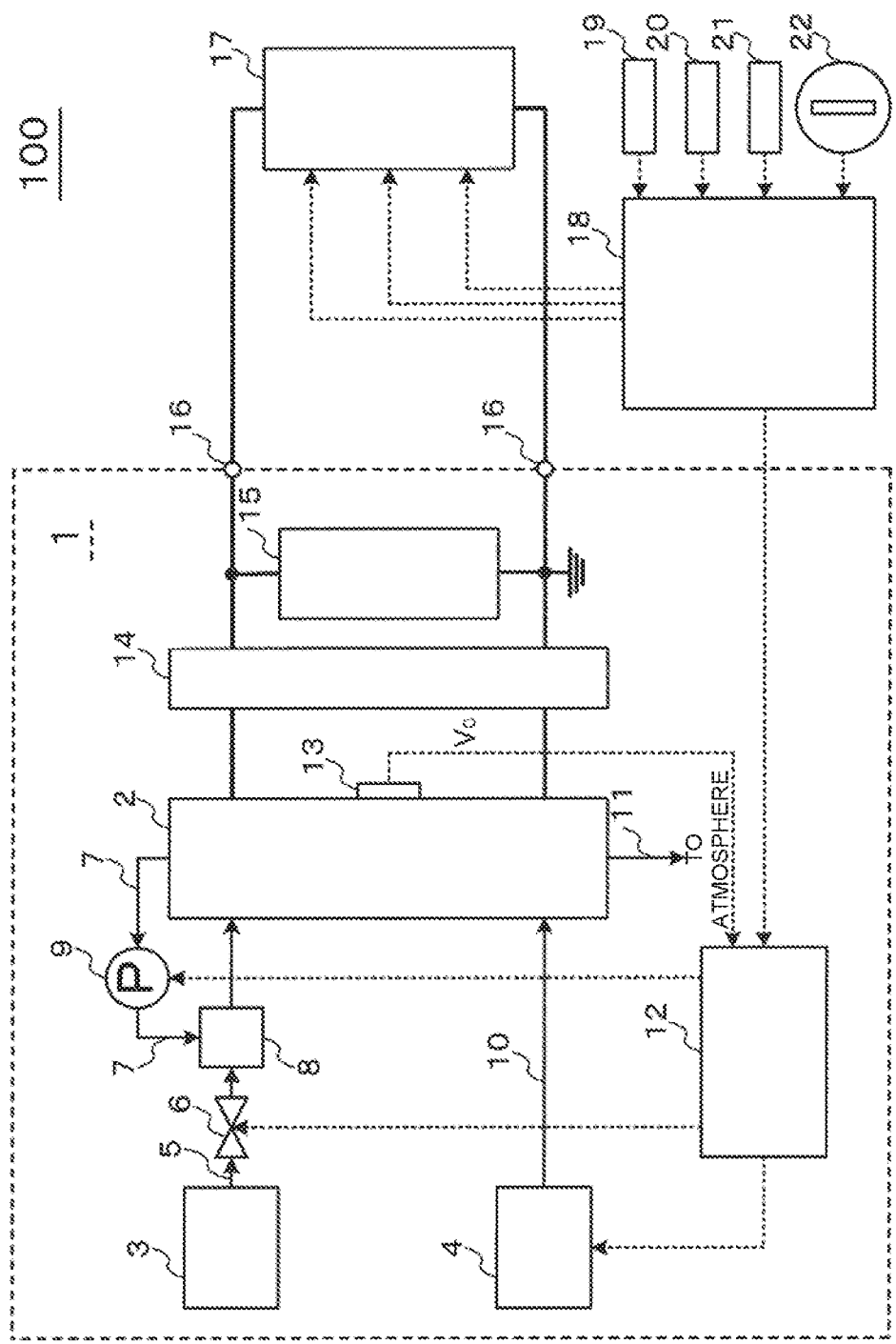
FIG. 1 shows a configuration of an industrial vehicle having a fuel cell system according to an embodiment of the present invention.

Referring to FIG. 1, there is schematically shown an industrial vehicle 100 on which a fuel cell system 1 according to a first embodiment of the present invention is mounted. In the following description, the fuel cell system 1 will be described as mounted on an industrial vehicle, such as a forklift truck which has a loading device. It is noted, however, that the industrial vehicle according to the present invention is not limited to forklift trucks and may be any other industrial vehicles, such as towing vehicles.

The fuel cell system 1 includes a fuel cell stack 2, a hydrogen tank 3 capable of supplying hydrogen gas, and an air compressor 4 capable of supplying air containing oxygen. The fuel cell stack 2 is configured by laminating a plurality of power generating cells each having an anode (a hydrogen electrode), a cathode (an air electrode), and a solid polyelectrolyte sandwiched between the anode and the cathode. The anodes of the power generating cells are supplied with hydrogen gas and the cathodes are supplied with air. A chemical reaction between the hydrogen gas and the oxygen contained in the supplied air takes place in each power generating cell and electrical energy is generated, accordingly. Electric power is thus generated in the fuel cell stack 2.

The fuel cell system 1 includes a hydrogen supply pipe 5 extending between the hydrogen tank 3 and the fuel cell stack 2, and a flow regulator valve 6 and an ejector 8 that are connected in the hydrogen supply pipe 5. The flow regulator valve 6 includes an injector that adjusts the flow rate of hydrogen gas supplied from the hydrogen tank 3 to the fuel cell stack 2 through the hydrogen supply pipe 5. The fuel cell system 1 further includes a hydrogen return pipe 7 extending between the fuel cell stack 2 and the ejector 8 and an electric pump 9 which is connected in the hydrogen return pipe 7.

Hydrogen gas in the hydrogen tank 3 is supplied to the fuel cell stack 2 through the hydrogen supply pipe 5. Part of the supplied hydrogen gas is used for chemical reaction with the oxygen in the fuel cell stack 2, while the unreacted residual hydrogen gas is discharged from the fuel cell stack 2 and delivered to the ejector 8 through the hydrogen return pipe 7 with the aid of the electric pump 9 so that the returned hydrogen gas is supplied to the fuel cell stack 2 again.

Air in the air compressor 4 is supplied to the fuel cell stack 2 through an air supply pipe 10. Part of the supplied air is used for chemical reaction with the hydrogen gas in the fuel cell stack 2, while the unreacted residual air is discharged from the fuel cell stack 2 through an air discharge pipe 11 to be discharged further into the atmosphere through a discharge pipe (not shown).

The fuel cell system 1 further includes a fuel cell system controller 12 having therein a microcomputer and a voltage sensor 13 which is attached to the fuel cell stack 2 and measures the cell voltage $V_c$ of the fuel cell stack 2. The electric power generation of the fuel cell system 1 is controlled by the fuel cell system controller 12 as the controller of the present invention in the following manner. The fuel cell system controller 12 acquires data of the cell voltage $V_c$ of the fuel cell stack 2 measured by the voltage sensor 13. The fuel cell system controller 12 controls the opening and closing of the flow regulator valve 6 and the rotational speed of the electric pump 9 so as to control the flow rate of the hydrogen gas to be supplied to the fuel cell stack 2. The fuel cell system controller 12 also controls the flow rate of the air discharged from the air compressor 4 so as to control the flow rate of the air to be supplied to the fuel cell stack 2. With such control of the flow rate of the hydrogen gas and the air by the fuel cell system controller 12, the electric power generation of the fuel cell stack 2 is controlled.

The output of the fuel cell stack 2 is connected to a DC/DC converter 14 and the output of the DC/DC converter 14 is connected to a capacitor 15. The output of the capacitor 15 is connected to the output 16 of the fuel cell system 1.

The output 16 of the fuel cell system 1 is connected to a vehicle load 17 that includes a loading motor and a traction motor and the like of the vehicle. The voltage of the DC power output from the fuel cell stack 2 is reduced to a specified level by the DC/DC converter 14 and supplied to the vehicle load 17. When the electric power generated by the fuel cell stack 2 exceeds the level that is required by the vehicle load 17, the surplus electric power is charged in the capacitor 15. When the electric power generated by the fuel cell stack 2 is smaller than the required electric power, electric power is supplied from the capacitor 15 to the vehicle load 17 to supplement the shortage of electric power.

The industrial vehicle 100 includes a vehicle controller 18 which includes a microcomputer. The vehicle controller 18 as the controller of the present invention is configured to control the fuel cell system 1 and the vehicle load 17 based on the operation of a steering wheel 19, an accelerator pedal 20, a lift lever 21 or the like which are operated by an operator of the industrial vehicle 100 and also based on the position or the manner of operating or manipulating the key switch 22.

Figure 2:
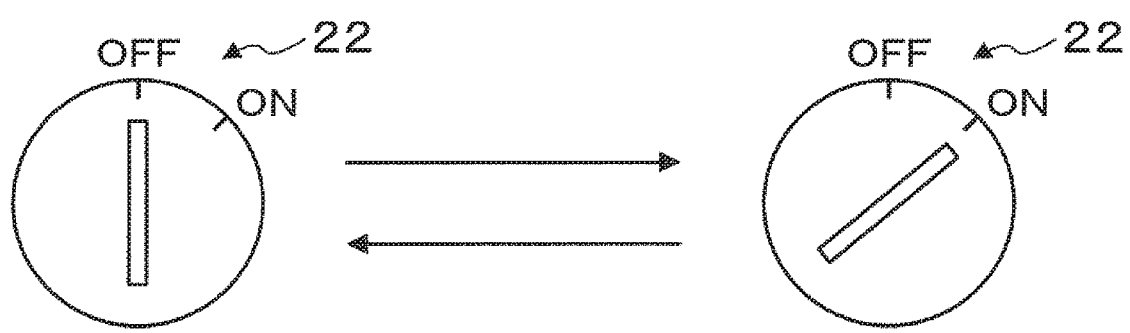
FIG. 2 shows a key switch of the industrial vehicle of FIG. 1.

As shown in FIG. 2, the key switch 22 has an ON position and an OFF position and is switchable between the ON and OFF positions. When the key switch 22 is located to the OFF position, the industrial vehicle 100 is stopped and inoperable. At this time, the flow regulator valve 6 is closed, the electric pump 9 and the air compressor 4 are stopped or suspended, and the supply of hydrogen gas and air to the fuel cell stack 2 is completely shut off. Therefore, when the key switch is at the OFF position, electric power is not generated in the fuel cell stack 2, and the cell voltage $V_c$ of the fuel cell stack 2 is 0 V, and the vehicle controller 18 and the fuel cell system controller 12 are placed in the standby mode.

The following will describe a control which is performed in conjunction with the operation of the key switch 22 by the operator of the industrial vehicle 100 having the fuel cell system 1.

Starting Vehicle and Starting Electric Power Generation of the Fuel Cell System

Figure 3A:
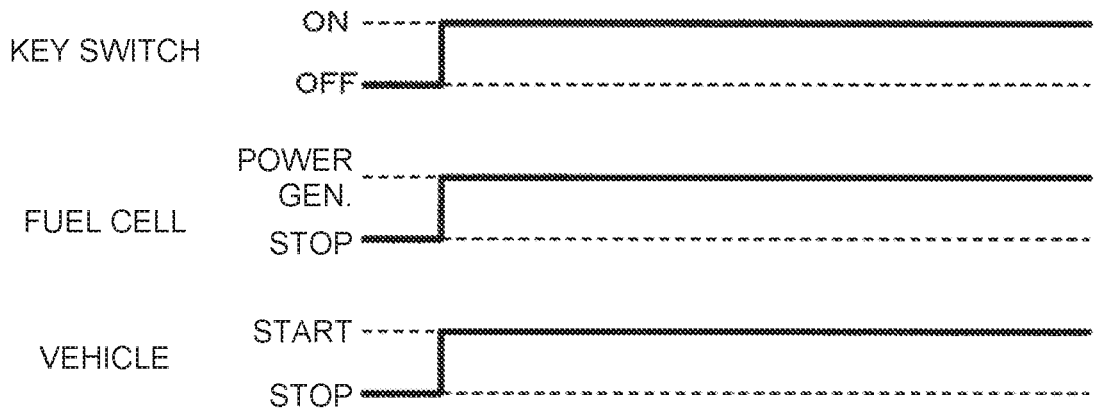
FIG. 3A is a chart showing a control performed when the key switch is switched from an OFF position to an ON position.

In starting the industrial vehicle 100 which is at a stop, the operator of the industrial vehicle 100 turns the key switch from the OFF position to the ON position. When the vehicle controller 18 detects the switching operation of the key switch 22 from the OFF position to the ON position, the vehicle controller 18 is activated and the vehicle becomes operable, accordingly. The activated vehicle controller 18 sends a start signal to the fuel cell system controller 12 to activate the fuel cell system controller 12. The activated fuel cell system controller 12 opens the flow regulator valve 6 and starts the electric pump 9 and the air compressor 4 to thereby supply hydrogen gas and air to the fuel cell stack 2 and hence to initiate generation of electric power in the fuel cell stack 2 of the fuel cell system 1, as shown in FIG. 3A.

Once the electric power generation of the fuel cell system 1 is started, the cell voltage $V_c$ of the fuel cell stack 2 increases gradually from its initial voltage of 0 V. Then, the fuel cell system controller 12 controls the amount of electric power generated in the fuel cell stack 2 so that the level of the cell voltage $V_c$ measured by the voltage sensor 13 is maintained between the minimum voltage (minimum allowable voltage $V_{min}$) and the maximum voltage (maximum allowable voltage $V_{max}$). The minimum allowable voltage $V_{min}$ and the maximum allowable voltage $V_{max}$ are available voltage levels that do not affect the performance of the power generating cells.

Figure 3B:
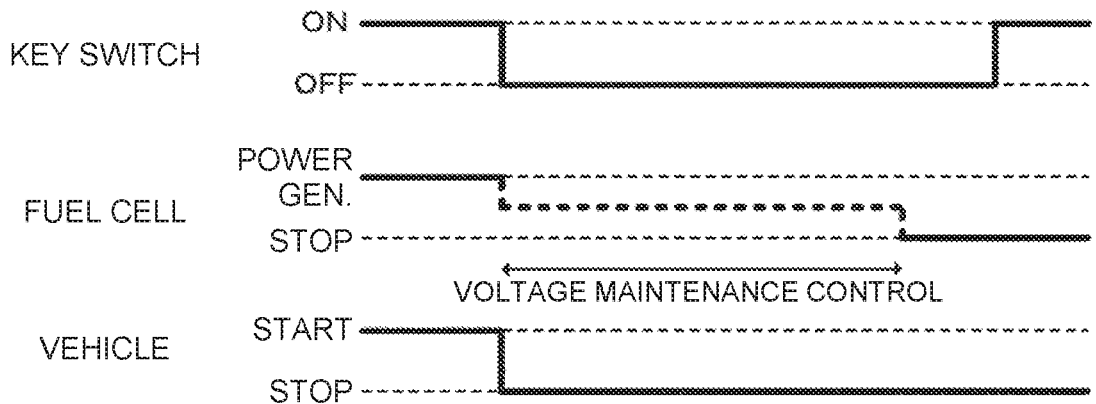
FIG. 3B is a chart showing a control performed when the key switch is switched from the ON position to the OFF position.

Stopping the Vehicle for a Short Period of Time and Control of Maintaining Voltage of the Fuel Cell System In a case when the operator of the industrial vehicle 100 needs to get off the industrial vehicle 100 temporarily for a certain work, the operator turns the key switch 22 from the ON position to the OFF position to stop the industrial vehicle 100 temporarily for a short period of time. When the vehicle controller 18 detects the switching operation of the key switch 22 from the ON position to the OFF position, the vehicle controller 18 stops and places the industrial vehicle 100 in an inoperable state, and at the same time, the vehicle controller 18 sends a start signal instructing a start of voltage maintenance control to the fuel cell system controller 12. Upon reception of the start signal, the fuel cell system controller 12 starts the voltage maintenance control for the fuel cell system 1, as shown in FIG. 3B. In the voltage maintenance control, the amount of electric power generated by the fuel cell stack 2 is reduced to its minimum while maintaining the level of the cell voltage $V_c$ between the minimum allowable voltage $V_{min}$ and the maximum allowable voltage $V_{max}$.

In the voltage maintenance control of the fuel cell system 1, the air compressor 4 is normally operated at a minimum allowable flow rate, which varies depending on the specifications of the air compressor. The flow regulator valve 6, which is normally closed, is opened when the hydrogen pressure drops. The electric pump 9 is operated at a low rotational speed. Supply of hydrogen gas to the fuel cell stack 2 is continued at a low flow rate.

Figure 4:
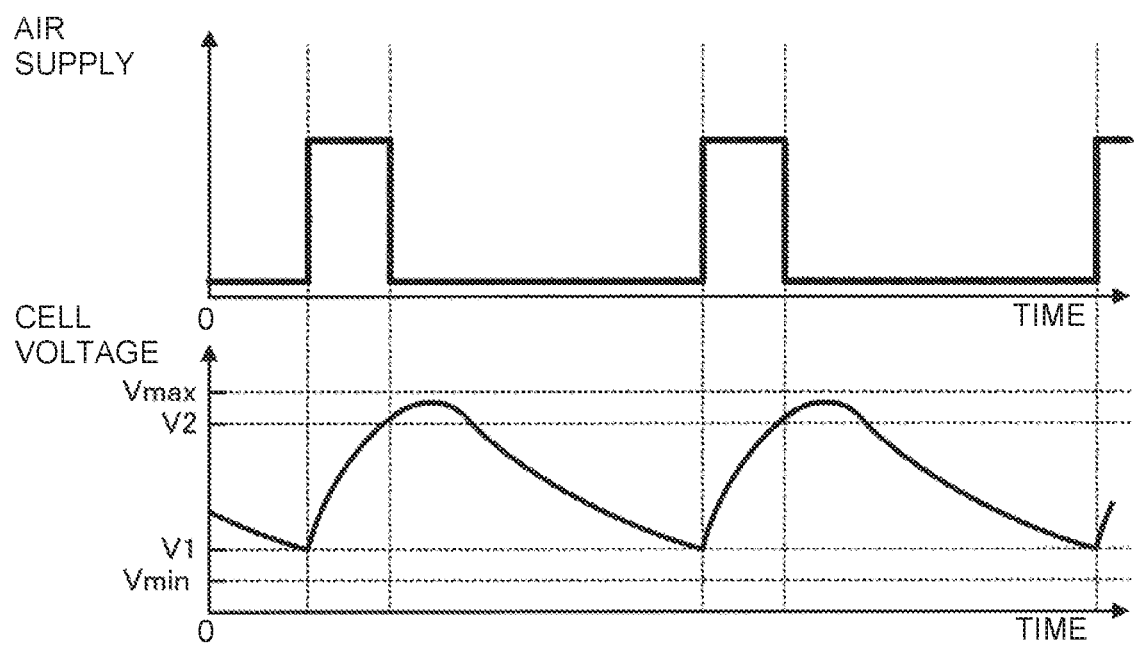
FIG. 4 shows charts explaining a control for maintaining cell voltages of fuel cells of the fuel cell system of FIG. 1.

As shown in FIG. 4, in the above described state of maintaining the voltage of the fuel cell system, when the cell voltage $V_c$ of the fuel cell stack 2 measured by the voltage sensor 13 drops to a first threshold voltage V1, which is a specified value slightly higher than the minimum allowable voltage $V_{min}$, the fuel cell system controller 12 causes the air compressor 4 to operate at a flow rate that is higher than its minimum flow rate. Meanwhile, when the cell voltage $V_c$ increases to a second threshold voltage V2, which is a specified value slightly lower than the maximum allowable voltage $V_{max}$, the fuel cell system controller 12 causes the air compressor 4 to operate at its minimum allowable flow rate again. With this control, the level of the cell voltage $V_c$ of the fuel cell stack 2 is maintained between the minimum allowable voltage $V_{min}$ and the maximum allowable voltage $V_{max}$.

When the operator of the industrial vehicle 100 turns the key switch 22 from the OFF position to the ON position again during the voltage maintenance control described above, the vehicle controller 18 starts and places the industrial vehicle 100 in the start mode so that the industrial vehicle 100 is ready to be operated, and at the same time, the vehicle controller 18 sends a resume signal instructing a resumption of the electric power generation to the fuel cell system controller 12. Upon reception of the resume signal, the fuel cell system controller 12 causes the fuel cell system 1 to resume the electric power generation. Since the initial value of the cell voltage $V_c$ of the fuel cell stack 2 is set to be higher than the minimum allowable voltage $V_{min}$ as described above, no rise of the cell voltage $V_c$ from 0 V occurs and therefore the variation of the cell voltage $V_c$ crossing the minimum allowable voltage $V_{min}$ is not caused. With this configuration, deterioration of the fuel cell stack 2 is prevented. Furthermore, since the air compressor 4 is not completely shut down during the voltage maintenance control, the electric power consumed at the resumption of the operation of the air compressor 4 is not large as compared with a case in which the air compressor 4 needs to be initially started, thus preventing decrease in energy efficiency.

The vehicle controller 18 is configured such that, when a specified time (e.g. 10 minutes) has elapsed since the transmission of the start signal of the voltage maintenance control, the vehicle controller 18 sends a stop signal instructing a stop of the electric power generation to the fuel cell system controller 12 to thereby stop or suspend the electric power generation of the fuel cell system 1. The vehicle controller 18 is so configured because the industrial vehicle 100 which is stopped by the switching operation of the key switch 22 from the ON position to the OFF position intending a temporary stop may not be re-started for a long period of time due to some reason.

Figure 3C:
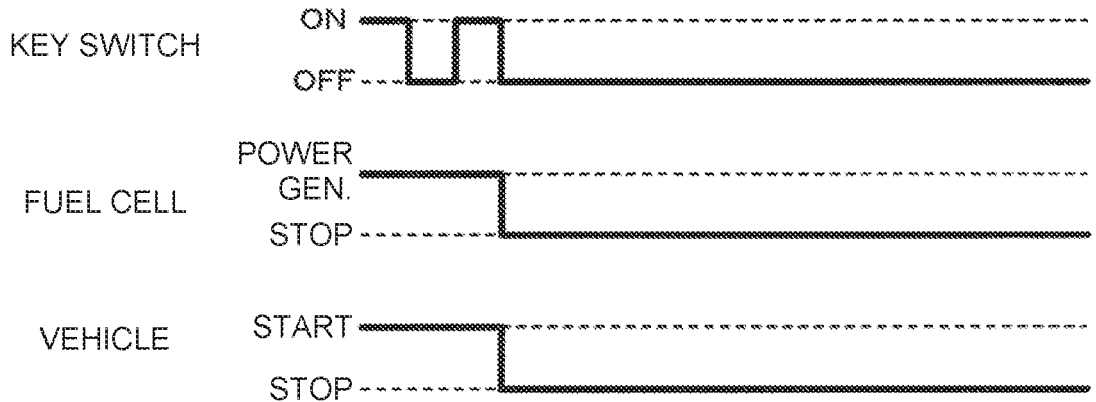
FIG. 3C is a chart showing a control performed when the key switch is manipulated in a specified manner.

Stopping the Vehicle for a Long Period of Time and Stopping Electric Power Generation of the Fuel Cell System In a case when the industrial vehicle 100 is stopped for a long period of time at the end of a loading work, for example, the operator of the industrial vehicle 100 needs to manipulate the key switch in a specified manner. According to the present embodiment, the operator cycles the key switch 22 from the ON position to the OFF position successively twice. Specifically, the operator turns the key switch 22 from the ON to OFF positions, then from the OFF to ON positions, and again from the ON to OFF positions, as illustrated in FIG. 3C. It is to be noted that the number of the cycles of the key switch operation from the ON position to the OFF position is not limited to two, and may optionally be set to three times or more. When the vehicle controller 18 detects that the key switch 22 is cycled from the ON position to the OFF position successively twice, the vehicle controller 18 stops the industrial vehicle 100 and places the industrial vehicle 100 in the inoperable state, and at the same time, the vehicle controller 18 sends a stop signal instructing a stop of the electric power generation to the fuel cell system controller 12.

Upon reception of the stop signal, the fuel cell system controller 12 closes the flow regulator valve 6 and stops the electric pump 9, so that the air compressor 4 is completely shut down when a specified period of time has elapsed since the closure of the flow regulator valve 6 and the stop of the electric pump 9. Then, the supply of hydrogen gas and air to the fuel cell stack 2 is shut off to thereby stop or suspend the electric power generation of the fuel cell stack 2 of the fuel cell system 1, as shown in FIG. 3C. When the electric power generation of the fuel cell system 1 is stopped, the fuel cell system controller 12 and the vehicle controller 18 are placed in the standby mode.

As described above, in order to stop the industrial vehicle 100 having the fuel cell system 1 according to the present embodiment of the present invention for a long period of time, the operator cycles the key switch 22 from the ON position to the OFF position successively twice. With this key switch operation, the fuel cell system 1 stops or suspends the electric power generation. In order to stop the industrial vehicle 100 for a short period of time, the operator turns the key switch from the ON position to the OFF position. This key switch operation triggers the voltage maintenance control of maintaining the level of the cell voltage $V_c$ between the minimum allowable voltage $V_{min}$ and the maximum allowable voltage $V_{max}$, while minimizing the amount of electric power generated in the fuel cell stack 2.

As described above, the cell voltage $V_c$ of the fuel cell stack 2 is set higher than the minimum allowable voltage $V_{min}$. Therefore, no rise of the cell voltage $V_c$ from 0 V occurs and therefore the variation of the cell voltage $V_c$ crossing the minimum allowable voltage $V_{min}$ is not caused in the start of the electric power generation of the fuel cell system 1 that involves turning the key switch 22 to the ON position again during the voltage maintenance control. With this configuration, deterioration of the fuel cell stack 2 is prevented. Furthermore, since the air compressor 4 is not shut down completely during the voltage maintenance control, the electric power consumed at the resumption of the operation of the air compressor 4 is not large as compared with the case in which the air compressor 4 needs to be initially started, thus preventing decrease in energy efficiency. With the above configuration, even if the key switch 22 of the industrial vehicle 100 is turned on and off frequently, deterioration of the fuel cell stack 2 and decrease in the energy efficiency are prevented.

According to the present embodiment, when a specified period of time has elapsed since a start of the voltage maintenance control, the electric power generation of the fuel cell system 1 is stopped or suspended. With this configuration, the electric power generation will not be unduly continued even in a case when the key switch 22 is turned from the ON position to the OFF position to temporarily stop the industrial vehicle 100 but the industrial vehicle 100 is not restarted for a long period of time due to some reason.

Second Embodiment

Figure 5:
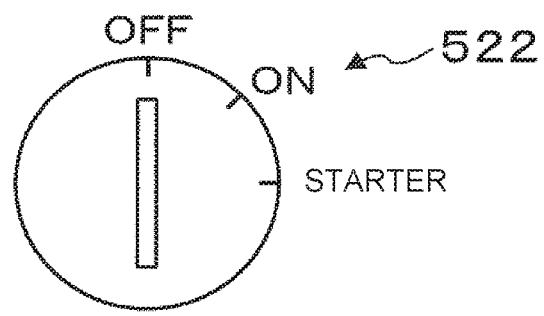
FIG. 5 shows a key switch of the industrial vehicle according to a second embodiment of the present invention.

According to the above embodiment, the key switch 22 has two positions, namely the ON and OFF positions. According to the present invention, however, the industrial vehicle 100 of the present invention may include a key switch 522 shown in FIG. 5, having a third position, such as a STARTER position, as well as the ON and OFF positions that are generally provided in an engine-driven vehicle. In this case, when it is detected that the key switch 522 is turned from the ON position to the OFF position, the industrial vehicle 100 is stopped for a short period of time, and it is detected that the key switch 522 is turned from the ON position to the STARTER position and then to the OFF position, the industrial vehicle 100 is stopped for a long period of time.

Sequence Listing
Not Applicable

What is claimed is:

1. An industrial vehicle having a fuel cell system, comprising:
a key switch having at least an ON position and an OFF position and switchable between the ON position and the OFF position, and
a controller configured to control the fuel cell system in conjunction with manipulation of the key switch, wherein
when the controller detects that the key switch is turned from the OFF position to the ON position, the controller causes the fuel cell system to start electric power generation,
when the controller detects that the key switch is turned from the ON position to the OFF position, the controller causes the fuel cell system to start a voltage maintenance control, and
when the controller detects that the key switch at the ON position is manipulated in a specified manner, the controller causes the fuel cell system to stop the electric power generation, and
wherein when the controller detects that the key switch at the ON position is turned from the ON position to the OFF position two or more times successively, the controller causes the fuel cell system to stop the electric power generation.

2. The industrial vehicle having the fuel cell system according to claim 1, wherein when a specified period of time has elapsed since the start of the voltage maintenance control, the controller causes the fuel cell system to stop the electric power generation.

3. An industrial vehicle having a fuel cell system, comprising:
a key switch having an OFF position, an ON position, and a STARTER position that are arranged in an order of the OFF position, the ON position, and the STARTER position;
a controller configured to control the fuel cell system in conjunction with manipulation of the key switch, wherein
when the controller detects that the key switch is turned from the OFF position to the ON position, the controller causes the fuel cell system to start electric power generation,
when the controller detects that the key switch is turned from the ON position to the OFF position, the controller causes the fuel cell system to start a voltage maintenance control, and
when the controller detects that the key switch at the ON position is manipulated in a manner of turning the key switch from the ON position to the STARTER position once and then to the OFF position, the controller causes the fuel cell system to stop the electric power generation,
when the controller detects that the key switch at the ON position is turned from the ON position to the STARTER position and then to the OFF position, the controller causes the fuel cell system to stop the electric power generation, and
when the key switch is at the STARTER position, the controller causes the fuel cell system to stop the electric power generation.

* * * * *